United States Patent [19]

Hartmann et al.

[11] Patent Number: 4,723,650
[45] Date of Patent: Feb. 9, 1988

[54] APPARATUS FOR TRANSFERRING PIECES OF SOFT CONSISTENCY, IN PARTICULAR FISH FILLETS

[75] Inventors: Franz Hartmann, Bad Oldesloe; Klaus Matern, Lübeck, both of Fed. Rep. of Germany

[73] Assignee: Nordischer Maschinenbau Rud. Baader GmbH + Co KG, Lubeck, Fed. Rep. of Germany

[21] Appl. No.: 879,096

[22] Filed: Jun. 26, 1986

[30] Foreign Application Priority Data

Jul. 4, 1985 [DE] Fed. Rep. of Germany ....... 3523923

[51] Int. Cl.⁴ .............................................. B65G 47/22
[52] U.S. Cl. ..................................... 198/457; 198/626
[58] Field of Search ............... 198/457, 626, 627, 500; 17/55

[56] References Cited

U.S. PATENT DOCUMENTS 3,170,558  2/1965  Normansell ..................... 198/457 X
4,149,624  4/1979  Douty et al. ......................... 198/500
4,230,218  10/1980  Kunzmann ..................... 198/627 X
4,488,634  12/1984  West ................................. 198/500 X

FOREIGN PATENT DOCUMENTS 553284   1/1960  Belgium ................................. 17/55
2460571  7/1975  Fed. Rep. of Germany .......... 17/55

Primary Examiner—Joseph E. Valenza
Assistant Examiner—D. Glenn Dayoan
Attorney, Agent, or Firm—Thomas R. Morrison

[57] ABSTRACT

The invention concerns an apparatus for transferring pieces or object of soft consistency, in particular fillets of fish, from a conveyance in their longitudinal direction into a conveyance in transversal direction and aims to solve the task to convey the fillets further in a stretched position lying side by side. For solving this task, a braking device is used in the region of the transitional position between a feeder and a delivering conveyor, which braking device comprises a driven conveyor whose lower run faces the conveying surface of the delivering conveyor leaving a gap thereto and is driven to rotate endlessly in the direction of movement of the conveying surface and essentially at the speed thereof.

15 Claims, 3 Drawing Figures

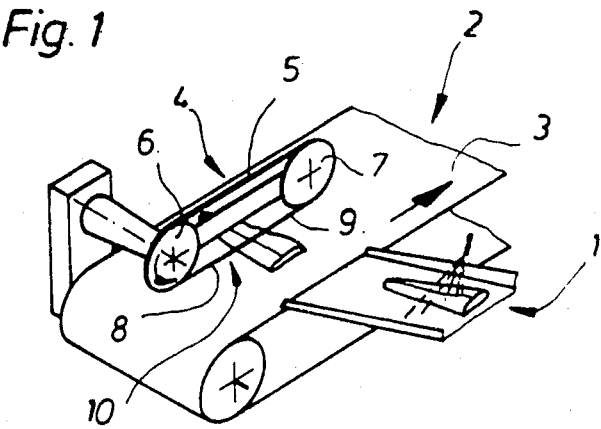
*Fig. 1*
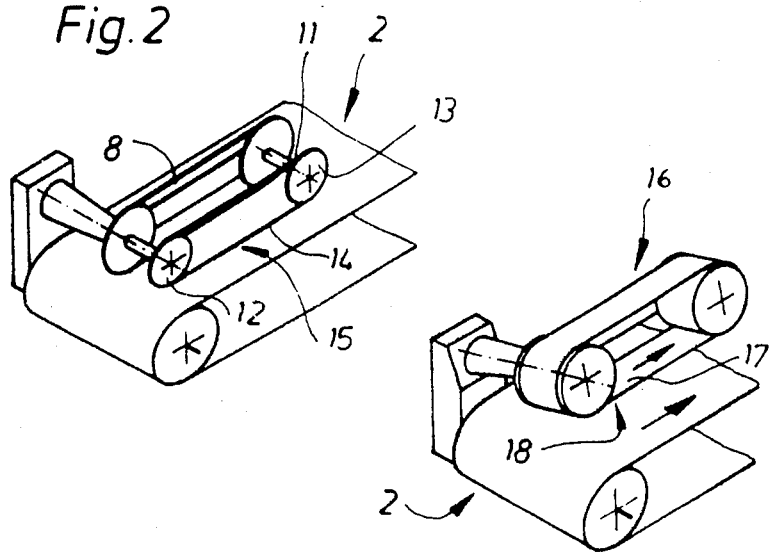
*Fig. 2*
*Fig. 3*

APPARATUS FOR TRANSFERRING PIECES OF SOFT CONSISTENCY, IN PARTICULAR FISH FILLETS

BACKGROUND OF THE INVENTION

1. Field of the Invention

The invention concerns an apparatus for transferring pieces of soft consistency, in particular fish fillets, from a first conveying direction which extends essentially in the direction of their longitudinal axis into a second conveying direction which extends essentially transversely thereto, the apparatus comprising feeding or supplying means and a delivery conveyor which follows the feeding means and runs essentially transversely thereto.

2. Prior Art

In automatic processing machines, as are used industrially these days, e.g. for producing skinned fish fillets, the mechanical process of treatment normally ends after the fillets have passed the skinning device. After that, the fillets undergo a quality inspection by way of visual inspection in order to detect quality reducing deficiencies such as remainders of fins or bones resulting from faulty cutting/ filleting, remainders of black belly skin as well as attack by parasites, and, if necessary to remove such deficiencies by manual treatment, which is known as "trimming". In view of the usual production speed, which, in the case of smaller or medium-sized bulk fish, is 240 fillets per minute and even more, this process, which is necessary for safeguarding the quality of the product, requires much personnel, which correspondingly entrains high costs. One of the factors which causes and increases such costs is the fact that the fillets must be placed singly and consecutively spread out on both sides for the purpose of an effective quality checking, which is in particular necessary in order to detect parasites (nematodes).

With regard to economics, the speed at which the fillets to be inspected pass the inspecting person is an essential point. One has to consider a tolerable limit speed which normally lies far below the speed of production of the fillets. For this reason, it is conventional in practice to divide the flow of fillets, i.e. to guide the left and right fillets into separate paths, respectively, and to reduce the speed of each path in addition by transferring the fillets from their longitudinal conveyance, with the tail end leading due to the processing which occurred before, into a transversal conveying. Such transferring enables a greater positioning density on the conveyor guiding the fillets further because then the smaller dimension of width of the fillets will only have to be taken into account for the sequence of fillets in contrast to the larger dimension of length.

However, there are certain difficulties in the transition of the fillets onto the transversal conveyor due to the varying kinetic energy, dependent on the respective mass, inhering in the arriving fillets. This varying energy has to be destroyed in the transition area of the conveyors without losing the stretched position of the fillets and/or without any distortion or twisting of the fillets occurring.

3. Objects of the Invention

It is therefore an essential object of the present invention to suggest a device which enables an exact, reliable and speedy transferring of fillets from a first direction of conveyance, which is essentially in the longitudinal direction, of the fillets into a second direction of conveyance, which is essentially transversal thereto. In particular, it is an object of the invention to safeguard a depositing of the fillets on the transversal conveyor performing the further guiding of the fillets in a streched position and essentially without any twisting or distorting of the fillets.

SUMMARY OF THE INVENTION

In an apparatus comprising feeding means for feeding the fillets in the first conveying direction and a delivering conveyor being associated to and following the feeding means, defining a transition position therewith and running essentially transversely thereof, these objects are achieved in that braking means are arranged in the region of the transition position from the feeding means to the delivering conveyor, which braking means are designed as a driven conveyor rotating endlessly, whose lower run opposes the conveying surface of the delivering conveyor to form a gap therewith, the rotation of the conveyor occurring in the conveying direction of the delivering conveyor at a speed approximately corresponding to the speed of the delivering conveyor.

The advantages to be obtained thereby particularly reside in that each fillet is already charged with an additional conveying component at the very moment it is collected, this additional conveying component safeguarding that the fillets are immediately conveyed-on in their transversal direction.

As conveying belt, the conveyor of the braking means may comprise a round belt, the gap between the lower run of the conveying belt and the conveying surface of the delivering conveyor advantageously being designed to be adjustable.

In order to avoid the danger of upsetting or crushing fillets in the transitional phase, it is expedient to keep the conveying surface of the delivering conveyor wetted by liquid, preferably water.

When wanting to handle fillets of a broad range of sizes, it is advantageous to provide the conveyor of the braking means as two conveying belts rotating side by side, the lower run of the conveying belt facing the feeding means having a larger distance from the conveying surface of the delivering conveyor than the lower run of the conveyor belt lying therebehind. Thus, it is achieved that particularly when fillets of the larger size range are processed the portion of the total mass of each fillet remaining in front of the braking arrangement will be relatively small, which has the consequence of less tendency towards twisting, in particular in the case of fillets already arriving slightly twisted or distorted. In this context, a further improvement can be achieved by designing the conveyor as a band conveyor whose lower run is arranged transversely inclined in a manner to form a wedge-shaped gap with the conveying surface of the delivering conveyor opening towards the feeding means.

BRIEF DESCRIPTION OF THE DRAWINGS

Other and further objects of the present invention will be apparent from the following description and claims and are illustrated in the accompanying drawings, which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings FIG. 1 shows a partial side view of the device according to the invention in axonometric representation, FIG. 2 shows a similar sectional view of the apparatus with a modified braking device, and FIG. 3 shows a similar view reflecting a further modification of the braking device.

DETAILED DESCRIPTION OF THE PREFERRED EMBODIMENTS

Supported by a non-shown machine frame, a feeding device (feeder) 1 designed as a chute and a delivering conveyor 2 are mounted such that their conveying directions run essentially perpendicular to each other and the feeder 1 ends in the marginal area of the delivery conveyor 2 and above a conveying surface 3 formed by the latter. The delivering conveyor 2 is driven in a suitable manner by a non-shown drive, the conveying speed of the delivering conveyor 2 being controlled such with respect to the supplying or feeding speed of the fillets that these will be taken over lying side by side without contacting each other. A braking device 4 is arranged above the conveying surface 3 of the delivering conveyor 2. The braking device is designed as a conveyor 5 including a conveyor belt 8 in the form of a round belt driven to rotate endlessly about deflection rollers 6 and 7 and extending in the direction of the delivering conveyor 2. The drive of the conveyor belt 8 is transferred from the drive of the delivering conveyor 2 and effects a rotational speed which corresponds to that of the delivering conveyor 2. The arrangement of the conveyor 5 is such that its lower run 9 leaves a parallel gap 10 with the conveying surface 3 of the delivering conveyor 2.

In the embodiment shown in FIG. 2 the conveyor 5 comprises a second conveyor belt 11 which, with regard to the feeder 1, is situated in front of the first conveyor belt 8 and extends parallel thereto. The deflection of the second conveyor belt 11 is obtained by means of deflection pulleys 12 and 13, whose diameters are smaller than that of deflection rollers 6 and 7. The lower run 14 of conveyor belt 11 thus forms a gap 15 with the conveying surface 3, which gap 15 is larger in relation to the gap 10 by the radial difference between the deflection rollers 6, 7 and the corresponding deflection pulleys 12, 13. In order to equalize the speeds of the conveyor belts 8 and 11, they may be driven via a non-shown hollow shaft having an inner shaft, the drive of the latter occurring at a higher number of revolutions.

In the embodiment shown in FIG. 3 the braking device 4 comprises a band conveyor 16, whose lower run 17 is arranged transversely inclined such with respect to the conveying surface 3 of the delivering conveyor 2 that a wedge-shaped gap 18 opening towards the feeder 1 is formed. Beyond that, this apparatus is arranged analogue to the embodiment of FIG. 1.

The function of the device is described in the following by way of the passage of a fillet through the apparatus according to FIG. 1:

A fillet arriving with its tail end leading from a skinning machine, which forms the last processing station of a filleting line, is fed via the feeder 1, designed as a chute and supported by water irrigation, to the transversely delivering conveyor 2. Moved forward by the kinetic energy inhering in the fillet the latter arrives under the braking device 4 essentially frictionless due to the fact that the conveying surface 3 of the delivering conveyor 2 is also wetted with water. The thinner tail portion of the fillet runs unobstructedly under the lower run 9 of the conveyor belt 8 until such portions of the fillet arrive in the region of the lower drum, whose dimension of thickness corresponds to the dimension of the gap 10 between the lower run 9 and the conveying surface 3. The thus starting contact of the fillet with the conveyor belt 8 initiates a braking of the fillet, in the course of which braking the aforementioned kinetic energy is absorbed. Due to the fact that the following portions of the fillet which are thicker keep on pushing forward, this absorption occurs over a certain course so that the braking process occurs smoothly and it is avoided that the fillet is deformed by crushing or upsetting or can yield laterally or deflect. Following the gradual increasing reduction of the component of movement extending transversely to the conveying direction of the delivering conveyor 2, the conveying component of the delivering conveyor 2 increases gradually until finally the fillet remains in a position of relative rest with respect to the conveying surface 3 and is conveyed further in a transversal position. When using the apparatus as shown in FIG. 2 the fillet at least almost simultaneously contacts the two conveyor belts 8 and 11. The thus occurring clamping or gripping of the fillet at two positions, which are at a distance to each other, effects a secure fixing of the fillet in view of its tendency to yield to the following fillet end.

In the apparatus as shown in FIG. 3 the effect is essentially the same.

What is claimed is:

1. An apparatus for transferring pieces of soft consistency, which define a longitudinal axis and are conveyed in a first conveying direction extending essentially in the direction of said longitudinal axis, from such first conveying direction into a second conveying direction extending essentially crosswise to said first conveying direction, said pieces having a thickness increasing in a direction opposite to said first conveying direction whereby thinner portions of said pieces lead in said first conveying direction, said apparatus comprising:

a delivering conveyor having a conveying surface, said conveying surface travelling in said second conveying direction;

feeding means for feeding said pieces in said first conveying direction onto said conveying surface, a portion of said conveying surface receiving said pieces defining a transition position;

braking means in said transition position;

said braking means including driven conveying means rotating endlessly and defining at least a lower run;

said lower run being disposed at a distance from said conveying surface of said delivering conveyor means to form a gap therewith;

said conveying means running in said second conveying direction at a speed essentially equal to that of said delivering conveyor means; and said gap being substantially greater than said thinnest portions and less than a maximum thickness of said pieces, whereby said pieces are braked in said transition portion, and are thereafter transported in said second conveying direction.

2. An apparatus as claimed in claim 1, wherein said conveying means of said braking means comprise a conveyor belt designed as a round belt.

3. An apparatus as claimed in claim 1, wherein said gap is adjustable.

4. An apparatus as claimed in claim 2, wherein said gap is adjustable.

5. An apparatus as claimed in claim 1, wherein at least said conveying surface of said delivering conveyor means is held wetted by liquid.

6. An apparatus as claimed in claim 2, wherein at least said conveying surface of said delivering conveyor means is held wetted by liquid.

7. An apparatus as claimed in claim 3, wherein at least said conveying surface of said delivering conveyor means is held wetted by liquid.

8. An apparatus as claimed in claim 4, wherein at least said conveying surface of said delivering conveyor means is held wetted by liquid.

9. An apparatus as claimed in claim 1, wherein said braking means comprise a first and a second conveying belt arranged to rotate side by side and each defining at least a lower run, said lower run of said first conveying belt nearer said feeding means having a larger distance to said conveying surface than said lower run of said second conveying belt lying further from said feeding means when seen in said first conveying direction.

10. An apparatus as claimed in claim 2, wherein said braking means comprise a first and second conveying belt arranged to rotate side by side and each defining at least a lower run, said lower run of said first conveying belt nearer said feeding means having a larger distance to said conveying surface than said lower run of said second conveying belt lying further from said first conveying belt when see in said first conveying direction.

11. An apparatus as claimed in claim 3, wherein said braking means comprise a first and second conveying belt arranged to rotate side by side and each defining at least a lower run, said lower run of said first conveying belt nearer said feeding means having a larger distance to said conveying surface than said lower run of said second conveying belt lying further from said first conveying belt when see in said first conveying direction.

12. An apparatus as claimed in claim 5, wherein said braking means comprise a first and second conveying belt arranged to rotate side by side and each defining at least a lower run, said lower run of said first conveying belt nearer said feeding means having a larger distance to said conveying surface than said lower run of said second conveying belt lying further from said first conveying belt when see in said first conveying direction.

13. An apparatus as claimed in claim 1, wherein said conveying means are designed as a band conveyor defining at least a lower run, which is arranged transversely inclined with respect to said conveying surface of said delivering conveyor means to form a wedge-shaped gap opening towards said feeding means.

14. An apparatus as claimed in claim 3, wherein said conveying means are designed as a band conveyor defining at least a lower run, which is arranged transversely inclined with respect to said conveying surface of said delivering conveyor means to form a wedge-shaped gap opening towards said feeding means.

15. An apparatus as claimed in claim 5, wherein said conveying means are designed as a band conveyor defining at least a lower run, which is arranged transversely inclined with respect to said conveying surface of said delivering conveyor means to form a wedge-shaped gap opening towards said feeding means.

* * * * *